(12) United States Patent
Yamashita (10) Patent No.: US 9,664,247 B2
(45) Date of Patent: May 30, 2017

(54) SHOCK ABSORBER (71) Applicant: HITACHI AUTOMOTIVE SYSTEMS, LTD., Ibaraki (JP)

(72) Inventor: Mikio Yamashita, Zama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/832,162

(22) Filed: Aug. 21, 2015

(65) Prior Publication Data

US 2016/0061284 A1    Mar. 3, 2016

(30) Foreign Application Priority Data

Aug. 29, 2014    (JP) .................... 2014-175674

(51) Int. Cl.
| | | |
|---|---|---|
| F16F 9/34 | (2006.01) |
| F16F 9/36 | (2006.01) |
| F16F 9/348 | (2006.01) |
| F16F 9/46 | (2006.01) |

(52) U.S. Cl.
CPC ............ *F16F 9/369* (2013.01); *F16F 9/3415* (2013.01); *F16F 9/3485* (2013.01); *F16F 9/465* (2013.01)

(58) Field of Classification Search
CPC ........ F16F 9/34; F16F 9/18; F16F 9/44; F16F 9/185; F16F 9/325; F16F 9/369; F16F 9/3482; F16F 9/062; F16F 9/26
See application file for complete search history.

(56) References Cited

U.S. PATENT DOCUMENTS

| | | | | | |
|---|---|---|---|---|---|
| 6,119,829 | A | * | 9/2000 | Nakadate | ............... F16F 9/348 188/266.6 |
| 2009/0242339 | A1 | * | 10/2009 | Nakadate | ............... F16F 9/464 188/266.5 |
| 2011/0147147 | A1 | * | 6/2011 | Murakami | ............. F16F 9/464 188/314 |
| 2012/0048666 | A1 | * | 3/2012 | Murakami | ............. F16F 9/348 188/315 |
| 2014/0291088 | A1 | * | 10/2014 | Katayama | ............ F16F 9/3485 188/313 |
| 2014/0353099 | A1 | * | 12/2014 | Yamashita | ............ F16F 9/3485 188/314 |
| 2015/0217621 | A1 | * | 8/2015 | Yamashita | ............ B60G 13/08 188/266.2 |

FOREIGN PATENT DOCUMENTS

JP        2006-38097        2/2006

* cited by examiner

*Primary Examiner* — Thomas J Williams
*Assistant Examiner* — James Hsiao
(74) *Attorney, Agent, or Firm* — Wenderoth, Lind & Ponack, L.L.P.

(57) ABSTRACT

A damping force is generated by controlling a flow of oil caused by a sliding displacement of a piston in a cylinder with the aid of a disk valve, against extension and compression of a piston rod. An elastic seal member, fixedly attached to a back surface side of the disk valve, is fitted in a recessed portion of a pilot body, by which a pilot chamber is formed and valve opening of the disk valve is controlled by inner pressure in the pilot chamber. The elastic seal member is in abutment with a bottom portion of the recessed portion, and the disk valve is urged toward inner and other seat portions by elasticity of the elastic seal member. This configuration ensures that the disk valve can be closed without a set load provided from deflection of the disk valve, thereby generating a stable low damping force.

13 Claims, 6 Drawing Sheets

SHOCK ABSORBER

BACKGROUND OF THE INVENTION

The present invention relates to a shock absorber configured to generate a damping force against a stroke of a piston rod.

Generally, a tubular hydraulic shock absorber mounted on a suspension apparatus of a vehicle, such as an automobile, is configured in such a manner that a piston with a piston rod coupled thereto is slidably fitted in a cylinder sealingly containing fluid, and a damping force adjustment mechanism including an orifice, a disk valve, and/or the like controls a flow of the fluid that is caused by a sliding displacement of the piston in the cylinder, thereby generating a damping force against a stroke of the piston rod.

Further, a hydraulic shock absorber disclosed in Japanese Patent Public Disclosure No. 2006-38097 includes a backpressure chamber (a pilot chamber) formed behind a disk valve, which is a damping force generation mechanism, with a flow of fluid partially introduced into the backpressure chamber to apply an inner pressure in the backpressure chamber in a direction causing the disk valve to be closed.

Then, this hydraulic shock absorber controls valve opening of the disk valve by adjusting the inner pressure in the backpressure chamber. This configuration can enhance flexibility in adjusting a damping force characteristic.

In the above-described shock absorber disclosed in Japanese Patent Public Disclosure No. 2006-38097, the backpressure chamber is formed by fixedly attaching a ring-shaped seal member made of an elastic member, such as a rubber, to an outer circumferential portion of a back surface of the disk valve by vulcanization, adhesion, or the like, and slidably and liquid-tightly fitting this seal member to a cylindrical portion of a bottomed cylindrical member disposed behind the disk valve.

The disk valve configured to use the ring-shaped seal member fixedly attached to one side in this manner necessitates a sufficient increase in a pressing force applied to a sliding portion to ensure a sealing performance of the seal member. However, the increase in the pressing force leads to an increase in a sliding resistance accordingly. A set load (a preload) is provided, i.e., the disk valve is seated on a seat portion while being deflected in advance to prevent this sliding resistance from making it difficult to close the disk valve, so as to ensure that the disk valve can be closed by being seated on the seat potion at the time of valve closing.

However, in recent years, the damping force adjustable shock absorber mounted on the suspension apparatus of the vehicle, such as the automobile, has been subject to a demand of sufficiently reducing the damping force in a region where a piston speed is low when the damping force characteristic is switched to a soft side, and providing the set load to the disk valve works against this demand.

SUMMARY OF INVENTION

The present invention has been contrived in consideration under these circumstances, and an object thereof is to provide a shock absorber that allows stable low damping to be acquired with use of a pilot-type damping valve including a pilot chamber formed by a disk valve with an elastic seal member fixedly attached thereto.

To achieve the above-described object, according to an aspect of the present invention, a shock absorber includes a cylinder sealingly containing hydraulic fluid, a piston slidably inserted in the cylinder, a piston rod coupled with the piston and extending out of the cylinder, a disk valve configured to, with respect to a flow of the hydraulic fluid that is caused by a sliding displacement of the piston, generate a damping force by being separated from or seated onto a valve seat to control the flow, a bottomed cylindrical pilot body opened toward the disk valve 33, and an annular elastic seal member fixedly attached to an outer circumferential portion of one end of the disk valve and slidably and liquid-tightly fitted to an inner circumferential portion of the pilot body. The elastic seal member forms a pilot chamber configured to apply an inner pressure therein to the disk valve in a valve-closing direction. The elastic seal member is in abutment with a bottom portion of the pilot body, and urges the disk valve toward the valve seat by elasticity of the elastic seal member.

The shock absorber further includes a communication passage establishing communication between chambers defined and formed in the pilot chamber by the elastic seal member in abutment with the bottom portion of the pilot body.

DESCRIPTION OF EMBODIMENTS

In the following description, one embodiment of the present invention will be described in detail with reference to the drawings.

Figure 1:
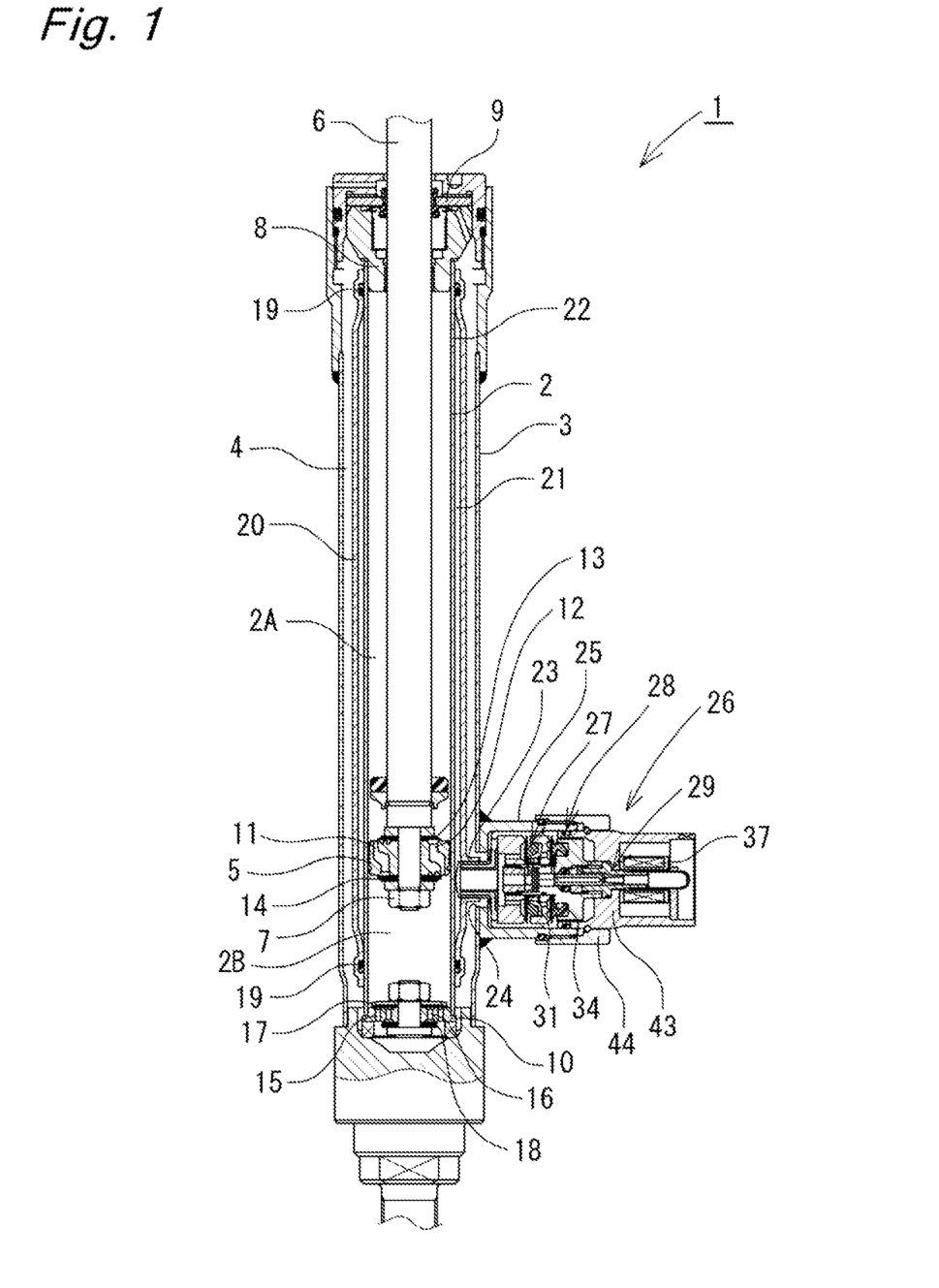
FIG. 1 is a vertical cross-sectional view of a damping force adjustable shock absorber according to a first embodiment of the present invention.

As illustrated in FIG. 1, a damping force adjustable shock absorber 1 according to the present embodiment has a twin-tube structure including an outer tube 3 disposed outside a cylinder 2, with a reservoir 4 formed between the cylinder 2 and the outer tube 3. A piston 5 is slidably fitted in the cylinder 2, and this piston 5 divides the inside of the cylinder 2 into two chambers, a cylinder upper chamber 2A and a cylinder lower chamber 2E. One end of a piston rod 6 is coupled to the piston 5 by a nut 7. An opposite end side of the piston rod 6 extends through the cylinder upper chamber 2A, is inserted through a rod guide 8 and an oil seal 9 attached to upper ends of the cylinder 2 and the outer tube 3, and extends out of the cylinder 2. A base valve 10 is provided at a lower end of the cylinder 2. The base valve 10 separates the cylinder lower chamber 2B and the reservoir 4 from each other.

Passages 11 and 12 are provided through the piston 5. The passages 11 and 12 establish communication between the cylinder upper and lower chambers 2A and 2B. Then, a check valve 13 is provided in the passage 12. The check valve 13 permits fluid only to flow from the cylinder lower chamber 2B side to the cylinder upper chamber 2A side, and is provided a set lead sufficiently small to allow the check valve 13 to be opened at the moment that the piston rod 6 is switched from an extension stroke to a compression stroke. Further, a disk valve 14 is provided in the passage 11. The disk valve 14 is opened when a pressure of the fluid on the cylinder upper chamber 2A side reaches a predetermined pressure during the extension stroke, and releases this pressure to the cylinder lower chamber 2B side. A valve-opening pressure of this disk valve 14 is considerably high, and is set to a valve-opening pressure that prohibits the disk valve 14 to be opened while a vehicle is running on a normal road surface, and an orifice 14A (refer to FIG. 3), which establishes a constant connection between the cylinder upper and lower chambers 2A and 2B, is provided at the disk valve 14.

Passages 15 and 16 are provided through the base valve 10. The passages 15 and 16 establish communication between the cylinder lower chamber 2B and the reservoir 4. Then, a check valve 17 is provided in the passage 15. The check valve 17 permits the fluid only to flow from the reservoir 4 side to the cylinder lower chamber 2B side, and is provided a set load sufficiently small to allow the check valve 17 to be opened at the moment that the piston rod 6 is switched from the compression stroke to the extension stroke. Further, a disk valve 18 is provided in the passage 16. The disk valve 18 is opened when a pressure of the fluid on the cylinder lower chamber 2B side reaches a predetermined pressure, and releases this pressure to the reservoir 4 side. A valve-opening pressure of this disk valve 18 is considerably high, and is set to a valve-opening pressure that prohibits the disk valve 18 to be opened while the vehicle is running on the normal road surface, and an orifice 18A (refer to FIG. 3), which establishes a constant connection between the cylinder lower chamber 2B and the reservoir 4, is provided at the disk valve 18. Oil is sealingly contained in the cylinder 2, and oil and gas are sealingly contained in the reservoir 4, as hydraulic fluid.

A separator tube 20 is externally fitted to the cylinder 2 via seal members 19 provided at the upper and lower ends thereof, with an annular passage 21 formed between the cylinder 2 and the separator tube 20. The annular passage 21 is in communication with the cylinder upper chamber 2A via a passage 22 formed through a sidewall of the cylinder 2 in the vicinity of the upper end thereof. A plurality of passages 22 may be provided while being arranged circumferentially, depending on a specification. A cylindrical connection port 23 is formed at a lower portion of the separator tube 20. The connection port 23 protrudes and is opened laterally. Further, an opening 24 is formed through a sidewall of the outer tube 3. The opening 24 is concentric with the connection port 23, and is larger in diameter than the connection port 23. A cylindrical case 25 is coupled to the sidewall of the outer tube 3 by welding or the like so as to surround this opening 24. Then, a damping force generation mechanism 26 is attached in the case 25.

Figure 2:
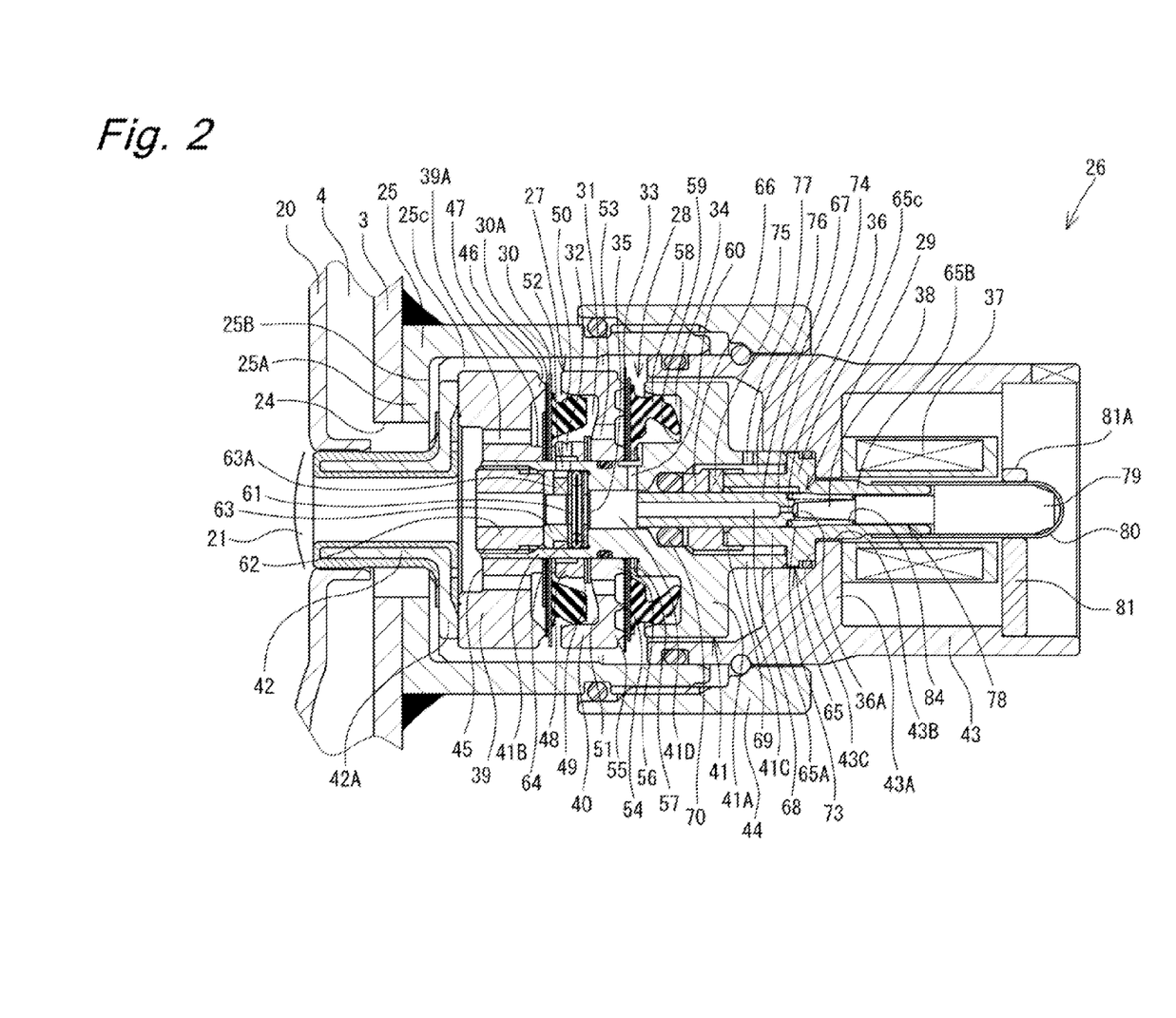
FIG. 2 is an enlarged vertical cross-sectional view of a damping force generation mechanism of the damping force adjustable shock absorber illustrated in FIG. 1.
Figure 3:
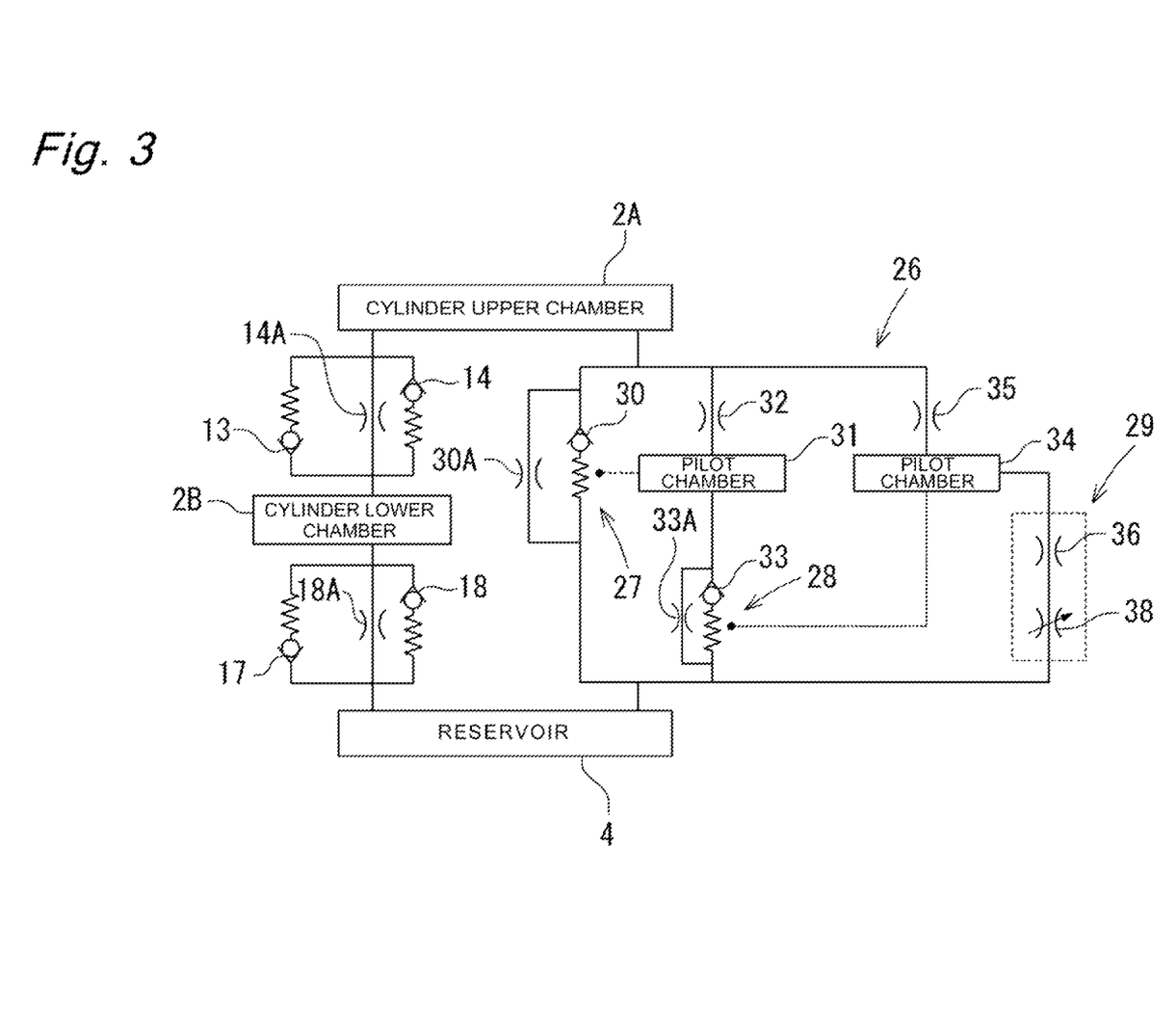
FIG. 3 illustrates a hydraulic circuit of the damping force adjustable shock absorber illustrated in FIG. 1.

Next, the damping force generation mechanism 26 will be described with reference to mainly FIGS. 2 and 3.

The damping force generation mechanism 26 includes a main valve 27, a control valve 28, and a pilot valve 29. The main valve 27 and the control valve 28 are a pilot-type valve mechanism, and the pilot valve 29 is a pressure control valve configured to be driven by a solenoid.

The in valve 27 includes a disk valve 30 and a pilot chamber 31. The disk valve 30 is opened by receiving the pressure of the fluid on the cylinder upper chamber 2A side, thereby permitting this fluid to flow toward the reservoir 4 side. The pilot chamber 31 applies an inner pressure therein to this disk valve 30 in a valve-closing direction. The pilot chamber 31 is connected to the cylinder upper chamber 2A side via a fixed orifice 32, and is also connected to the reservoir 4 side via the control valve 28. An orifice 30A is provided at the disk valve 30. The orifice 30A establishes a constant connection between the cylinder upper chamber 2A side and the reservoir 4 side.

The control valve 28 includes a disk valve 33 and a pilot chamber 34. The disk valve 33 is opened by receiving a pressure of the fluid on the pilot chamber 31 side, thereby permitting this fluid to flow toward the reservoir 4 side. The pilot chamber 34 applies an inner pressure therein to this disk valve 33 in a valve-closing direction. The pilot chamber 34 is connected to the cylinder upper chamber 2A side via a fixed orifice 35, and is also connected to the reservoir 4 side via the pilot valve 29. An orifice 33A is provided at the disk valve 33. The orifice 33A establishes a constant connection between the pilot chamber 31 side and the reservoir 4 side.

The pilot valve 29 is configured to narrow a flow passage with a small-diameter port 36, and adjust the inner pressure in the pilot chamber 34 of the control valve 28 by Opening and closing this port 36 by a valve body 38 driven by a solenoid 37. The small diameter of the port 36 leads to a small pressure-receiving area, which allows the pilot valve 29 to achieve a high pressure when being closed under a maximum electric current, resulting in an increase in a differential pressure between a high electric current and a low electric current, thereby succeeding in expanding a range where the damping force characteristic can vary.

Next, a specific configuration of the damping force generation mechanism 26 will be described in further detail with reference to mainly FIG. 2.

A main body 39, a control body 40, and a pilot body 41 with the main valve 27, the control valve 28, and the pilot valve 29 installed therein are disposed in the case 25 together with a passage member 42, and a solenoid case 43 is attached to an end of an opening of the case 25 by a nut 44 to sealingly close the case 25, by which these components are fixed to the case 25. The solenoid case 43 has a generally cylindrical shape containing an intermediate wall 43A axially dividing the inside of the solenoid case 43. One end of the solenoid case 43 is inserted and fitted in the case 25. Further, an opposite end of the solenoid case 43 is fixed to the case 25 by the nut 44 while protruding out of the case 25. An opening 43A and an annular recessed portion 43C are formed through and at the intermediate wall 43A. The opening 43B penetrates through a center of the intermediate wall 43A. The annular recessed portion 43C is formed around a one-end side of the opening 43B.

The passage member 42 has a cylindrical shape including a flange portion 42A on an outer circumference at one end thereof. The flange portion 42A is in abutment with an inner flange portion 25A of the case 25, and a cylindrical portion of the passage member 42 is liquid-tightly inserted in the connection port 23 of the separator tube 20, by which the passage member 42 is connected to the annular passage 21. A plurality of radially extending passage grooves 25B is formed on the inner flange portion 25A of the case 25. The reservoir 4 and a chamber 25C in the case 25 are in communication with each other via these passage grooves 25B and the opening 24 of the outer tube 3.

The main body 39 and the control body 40 each have an annular shape, and the pilot body 41 has a stepped cylindrical shape including a large-diameter portion 41A at an intermediate portion thereof. A cylindrical portion 41B on an one-end side of the pilot body 41 is inserted in the main body 39 and the control body 40, and a cylindrical portion 41C on an opposite-end side of the pilot body 41 is fitted in the recessed portion 43C of the intermediate wall 43A of the solenoid case 43, by which these components are positionally fixed concentrically with one another.

A plurality of axially penetrating passages 39A is formed through the main body 39 while being arranged along a circumferential direction. The passages 39A are in communication with the passage member 42 via an annular recessed portion 45 formed at one end of the main body 39. An annular seat portion 46 and an annular clamp portion 47 protrude on an outer circumferential side and an inner circumferential side of openings of the plurality of passages 39A on an opposite end of the main body 39, respectively. An outer circumferential portion of the disk valve 30, which constitutes the main valve 27, is seated on the seat portion 46 of the main body 39. An inner circumferential portion of the disk valve 31 is clamped between the clamp portion 47 and the control body 40 together with an annular retainer 48 and a washer 49. An annular elastic seal member 50 made of an elastic member, such as a rubber, is fixedly attached to an outer circumferential portion on a back surface side of the disk valve 30 by a fixing attachment method, such as vulcanization adhesion. The disk valve 30 is formed by stacking flexible disk-shaped valve bodies as necessary so as to acquire a desired deflection characteristic. Further, a cutout is formed on the outer circumferential portion of the disk valve 30. This cutout forms the orifice 30A, which establishes constant communication between the passage 39A side and the reservoir chamber 25C side.

An annular recessed portion 51 is formed on a one-end side of the control body 40. An outer circumferential portion of the elastic seal member 50 fixedly attached to the disk valve 30 is slidably and liquid-tightly fitted in this recessed portion 51, by which the pilot chamber 31 is formed within the recessed portion 51. The disk valve 30 is lifted from the seat portion 46 to be opened by receiving a pressure on the passage 39 A side, thereby establishing the communication between the passages 39A and the chamber 25C in the case 25. The inner pressure in the pilot chamber 31 is applied to the disk valve 30 in the valve-closing direction. The pilot chamber 31 is in communication with the inside of the cylindrical portion 41B via a fixed orifice 32 formed through a sidewall of the retainer 48 and a passage 52 formed through a sidewall of the cylindrical portion 41B of the pilot body 41, and is further in communication with the passage member 42. Further, a bottom portion forming the annular recessed portion 51 of the control body 40 is formed so as to have a thickness increasing toward a central side, i.e., the pilot body 41 side. The reason therefor is as follows. The central side, i.e., the pilot body 41 side is subject to application of an axial force and therefore should be rigid, whereby the bottom portion is formed sufficiently thickly here. On the other hand, the bottom portion is formed thinly on an outer circumferential side thereof compared to the central side to allow the pilot chamber 31 to have a sufficient volume.

A plurality of axially penetrating passages 53 is formed through the control body 40 while being arranged along a circumferential direction. One ends of the passages 53 are in communication with the pilot chamber 31. An annular inner seat portion 54 is protrudingly provided as a valve seat on an outer circumferential side of openings of the plurality of passages 53 on an opposite end of the control body 40. An outer seat portion 55 is protrudingly provided on an outer circumferential side of the inner seat portion 54. Further, an annular clamp portion 56 is protrudingly provided on an inner circumferential side of the plurality of passages 53. The disk valve 33, which constitutes the control valve 28, is seated on the inner and outer seat portions 54 and 55. An inner circumferential portion of the disk valve 33 is clamped between the clamp portion 56 and the large-diameter portion 41A of the pilot body 41 together with a washer 57. An annular elastic seal member 58 made of an elastic member, such as a rubber, is fixedly attached to an outer circumferential portion on a back surface side of the disk valve 33 by a fixing attachment method, such as the vulcanization adhesion. The disk valve 33 is formed by stacking flexible disk-shaped valve bodies as necessary so as to acquire a desired deflection characteristic. The disk valve 33 will be described in further detail below.

The annular recessed portion 59 is formed on a one-end side of the large-diameter portion 41A of the pilot body 41. The annular recessed portion 59 serves as a pilot case forming the pilot chamber 34. An outer circumferential portion of the elastic seal member 58 fixedly attached to the disk valve 33 is slidably and liquid-tightly fitted in this recessed portion 59, by which the pilot chamber 34 is formed in the recessed portion 59. The disk valve 33 is sequentially lifted from the outer and inner seat portions 55 and 54 to be opened by receiving a pressure on the passage 53 side in communication with the pilot chamber 31 of the main valve 27, thereby establishing communication between the passages 53 and the chamber 25C in the case 25. The inner pressure in the pilot chamber 34 is applied to the disk valve 33 in the valve-closing direction. The pilot chamber 34 is in communication with a passage 41D in the cylindrical portion 41B via a passage 60 formed through a sidewall of the pilot body 41, and is further in communication with the inside of the passage member 42 via a fixed orifice 35 and a filter 61 provided in the cylindrical portion 41B. The fixed orifice 35 and the filter 61 are fixed to a stepped portion 64 in the cylindrical portion 41B by a cylindrical retainer 62 threadably inserted in a distal portion of the cylindrical portion 41B, and a spacer 63. A cutout 63A is formed through a sidewall of the spacer 63. The cutout 63A establishes communication between the fixed orifice 35 and the passage 41D in the cylindrical portion 41B.

A guide member 65 is inserted in the cylindrical portion 41C on the opposite end of the pilot body 41, the opening 43B of the solenoid case 43, and the recessed portion 43C of the solenoid case 43. The guide member 65 has a stepped cylindrical shape including a small-diameter port, press-fitting portion 65A on a one-end side thereof, a small-diameter plunger guide portion 65B on an opposite-end side thereof, and a large-diameter portion 65C at an intermediate portion thereof. The port press-fitting portion 65A of the guide member 65 is inserted in the cylindrical portion 41C of the pilot body 41 with a space formed therebetween. The plunger guide portion 65B is inserted through the opening 43B of the solenoid case 43, and protrudes into the opposite-end side of the solenoid case 43. The large-diameter portion 65C is fixed in the recessed portion 43C by being fitted in the recessed portion 43C of the solenoid case 43, and abutting against the cylindrical portion 41C of the pilot body 41 that is inserted and fitted in the recessed portion 43C.

A generally cylindrical port member 67 is press-fitted and fixed in the port press-fitting portion 65A of the guide member 65. An annular retainer 66 is attached to a distal portion of the port press-fitting portion 65A. An O-ring 70 seals between an outer circumferential surface of the port member 65 and an inner circumferential surface of the cylindrical portion 41C of the pilot body 41. A passage 68 in the port member 67 is in communication with the passage 41D in the pilot member 41.

The port 36 is formed at an end of the port member 67 that is press-fitted in the guide member 65. The port 36 is formed by reducing an inner diameter of the passage 68. The port 36 is opened to the inside of a valve chamber 73 formed in the guide member 65. The valve chamber 73 is in communication with the chamber 25C in the case 25 via an axial groove 74 formed on the port press-fitting portion 65A of the guide member 65, an annular recessed portion 69 formed at an inner circumferential edge of an opening of the port press-fitting portion 65A, a radial passage 75 formed through the retainer 66, an annular space 76 between the port press-fitting portion 65A of the guide member 65 and the cylindrical portion 41C of the pilot body 41, and a passage 77 extending through the sidewall of the cylindrical portion 41C. The passage 68 in the pert member 67 is in communication with the pilot chamber 34 via the passage 60, and is in communication with the inside of the passage member 42 via the fixed orifice 35 and the filter 61.

A plunger 78 is inserted in the plunger guide portion 65B of the guide member 65, and the plunger 78 is slidably guided in the plunger guide portion 65E along an axial direction of the plunger guide portion 65B. The tapering valve body 38 is provided at a distal portion of the plunger 78. The valve body 38 is inserted in the valve chamber 73 in the guide member 65, and opens and closes the port 36 by being separated from and seated on a seat portion 36A at an end of the port member 67. A large-diameter armature 79 is provided at a proximal portion of the plunger 78. The armature 79 is disposed outside the plunger guide 65E. A generally bottomed cylindrical cover 60 covering the armature 79 is attached to the plunger guide portion 65B. The cover 80 guides the armature 79 movably along the axial direction.

The solenoid 37 is disposed around the plunger guide portion 65B protruding from the intermediate wall 43A of the solenoid case 43 and the cover 80 in the solenoid case 43. The solenoid 37 is fixed around the plunger guide 65B and the cover 80 by a closing member 81 attached to the opening of the solenoid case 43. A lead wire (not illustrated) connected to the solenoid 37 extends to the outside via a cutout 61A of the closing member 81. The plunger 78 is urged in a valve-opening direction for separating the valve body 38 from the seat portion 36A to open the port 36 by a spring force of a return spring 34 disposed between the plunger 78 and the port member 67. Power supply to the solenoid 37 generates a thrust force, thereby causing the plunger 78 to be displaced in a valve-closing direction for seating the valve boy 38 onto the seat portion 36A to close the port 36 against the spring force of the return spring 64.

Next, the disk valve 33 of the control valve 28 will be described in further detail with reference to FIGS. 4 to 6.

Figure 4:
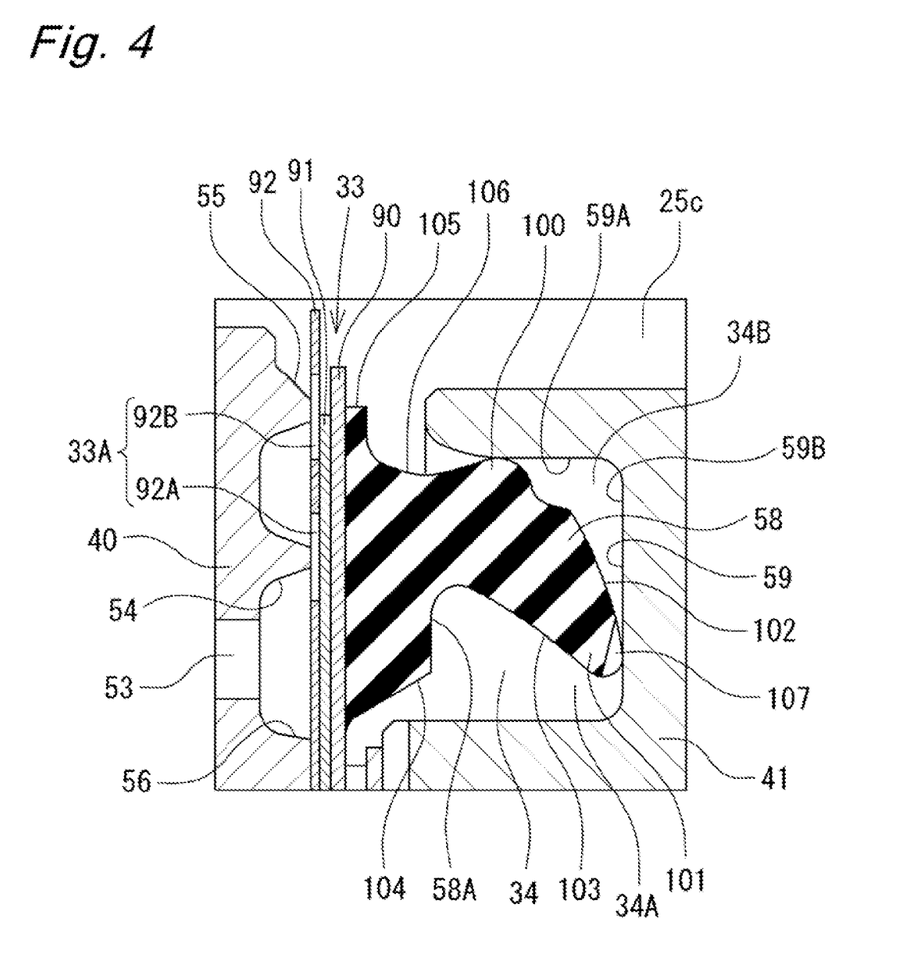
FIG. 4 is an enlarged vertical cross-sectional view of a dish valve portion of the damping force generation mechanism illustrated in FIG. 2.

As illustrated in FIG. 4, the disk valve 33 includes the metallic disk main body 90 and the annular elastic seal member 58. The elastic seal member 58 is made of the elastic member, such as the rubber, fixedly attached to a one-surface side, i.e., the back surface-side (the pilot chamber 34 side) of the disk main body 90. In the present embodiment, the elastic seal member 58 is made of the rubber, and is fixedly attached to the disk main body 90 by the vulcanization adhesion, but another method may be employed as the fixing attachment method. A disk-shaped spacer 91 and a seat disk 92 are stacked on an opposite-surface side, i.e., a front-surface side (the inner and outer seat portion 54 and 55 side) of the disk valve 33.

Figure 5:
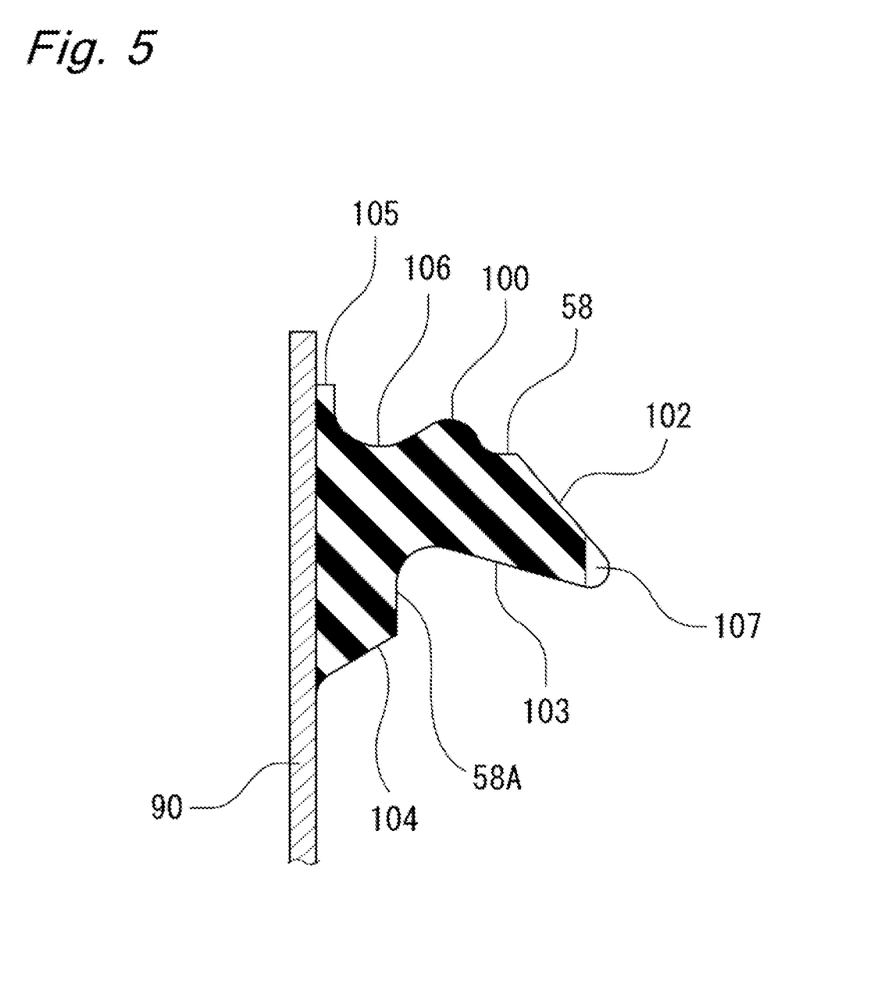
FIG. 5 is a vertical cross-sectional view of an elastic seal member portion of the disk valve illustrated in FIG. 4.
Figure 6:
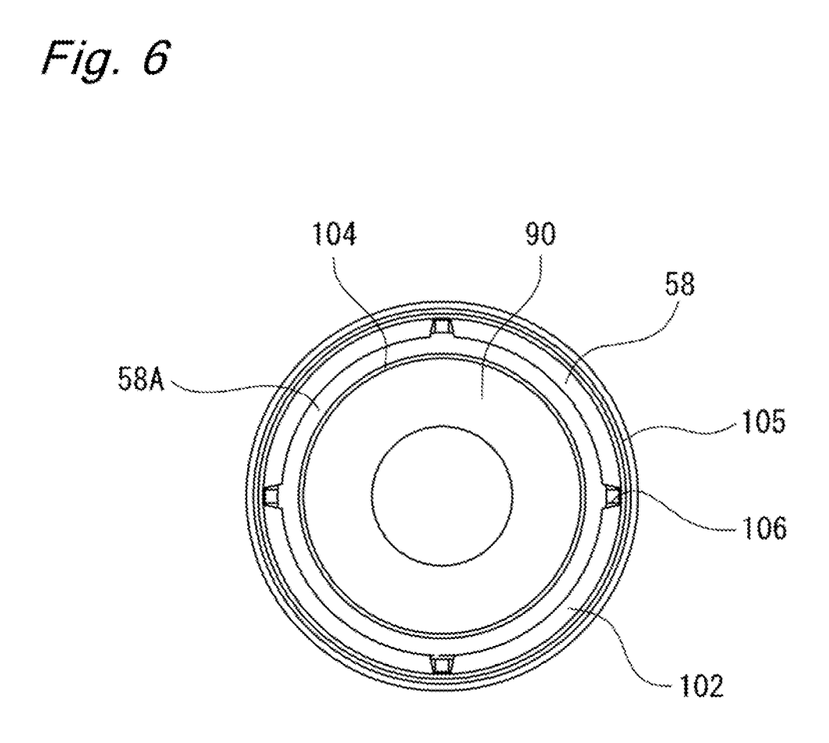
FIG. 6 is an end view of the disk valve illustrated in FIG. 4 on an elastic seal member side.

As illustrated in FIGS. 4 to 6, the pilot body 41 includes the recessed portion 59 opened toward the disk valve 33. The elastic seal member 58 includes a lip portion 100 and an abutment portion 101. The lip portion 100 is in liquid-tight and sliding contact with an inner circumferential surface 59A of the recessed portion 59. The abutment portion 101 is in abutment with a bottom portion 59B of the recessed portion 59. A proximal side of the elastic seal member 58 that is fixedly attached to the disk main body 90 has a small inner diameter, and a radially great thickness. On the other hand, a distal side of the elastic seal member 58 has a larger inner diameter than the proximal side, and a radially thinner thickness than the proximal side. The distal side of the elastic seal member 58 includes a stepped portion 58A formed on an inner circumferential side thereof. The stepped portion 58A generally extends in parallel with an end surface of the disk main body 90. An outer circumferential side of the thin distal portion of the elastic seal member 58 forms an outer taper portion 102 having a tapering shape with its dimension reducing toward a tip thereof. An inner circumferential side of the thin distal portion of the elastic seal member 58 forms an inner taper portion 103 having a tapering shape inclined inwardly toward the tip thereof. An angle defined between a line set by extending a tangential line of the outer taper portion 102 to the disk main body 90, and the disk main body 90 is smaller than an angle defined between a line set by extending a tangential line of the inner taper portion 103 to the disk main body 90, and the disk main body 90. The distal portion between the outer taper portion 102 and the inner-taper portion 103 of the elastic seal member 58 is rounded. Further, a portion where the inner taper portion 103 and the stepped portion 58A are connected to each other is rounded. The inner circumferential portion of the thick proximal portion of the elastic seal member 58 forms a taper portion 104 having a tapering shape with a diameter thereof increasing toward the distal side.

The elastic seal member 58 includes the thick proximal portion. A flange portion 105 is provided at a portion of the thick proximal portion where the outer circumferential portion of this thick proximal portion is coupled to the disk main body 90. The flange portion 105 protrudes radially outwardly. The thin distal side of the elastic seal member 58 includes a thick proximal portion. The lip portion 100 is formed at this thick proximal portion of the distal side adjacently to the outer taper portion 102. The lip portion 100 is generally arcuate in cross-section. The lip portion 100 and the flange portion 105 are coupled to each other by a curved portion 106 concavely and smoothly curved. As illustrated in FIG. 4, when the elastic seal member 58 is fitted in the recessed portion 59 of the bottomed cylindrical pilot body 41, the lip portion 100 is pressed against the inner circumferential surface 59A of the recessed portion 59 into close contact with the inner circumferential surface 59A. The abutment portion 101 is deflected toward the inner circumferential side by being pressed against the bottom portion 59B of the recessed portion 59, and urges the disk main body 90 by an elastic force therefrom toward the inner seat portion 54 and the outer seat portion 55 side.

A communication groove 107 is formed at a distal portion of the abutment portion 101 of the elastic seal member 58. The communication groove 107 extends radially from the outer taper portion 102 to the inner taper portion 103. The abutment portion 101 includes one or more communication groove(s) 107 arranged along a circumferential direction (in the illustrated example, four communication grooves 107 are arranged at even intervals). The arrangement allows communication to be established between two chambers 34A and 34B defined and formed in the pilot chamber 34 by the abutment portion 101 via a communication passage or communication passages defined by the communication groove(s) 107 when the elastic seal member 58 is fitted in the recessed portion 59 of the pilot member 41 with the abutment portion 101 in abutment with the bottom portion 59B of the recessed portion 59.

Orifice holes 92A and 92B are provided at the seat disk 92 at positions facing the inner and outer seat portions 54 and 55, respectively. An orifice 33A, which establishes constant communication between the pilot chamber 31 and the chamber 25C, is formed by the orifice holes 92A and 92B. An outer diameter of the disk main body 90 of the disk valve 33 is larger than an inner diameter of the inner circumferential surface of the recessed portion 59 of the pilot body 40. The flange portion 105 of the elastic seal member 58 faces a distal portion of the cylindrical portion forming the recessed portion 59 of the pilot body 41 with a space generated therebetween.

The disk valve 33, the spacer 91, and the seat disk 92 each have a flat-plate shape. The clamp portion 56, the inner seat portion 54, and the outer seat portion 55 of the control body 40 protrude by approximately equal lengths to one another. This configuration allows the disk valve 33 (the seat disk 29, the spacer 91, and the disk main body 90) to be seated on the inner seat portion 54 and the outer seat portion 55 with a sufficiently small (almost zero) seat load (preload) provided thereto, i.e., without being deflected.

In the present embodiment, the elastic seal member 50 of the disk valve 30 of the main valve 27 is configured similarly to a conventional seal member, but may be configured similarly to the above-described elastic seal member 58 of the disk valve 33 of the control valve 28.

An operation of the damping force adjustable shock absorber 1 configured in this manner will be described next.

The damping force adjustable shock absorber 1 is mounted between a sprung side and an unsprung side of a suspension apparatus of the vehicle. When being in a normal operation state, the damping force adjustable shock absorber 1 performs pressure control with use of the pilot valve 29 by supplying power to the solenoid 37, generating a thrust force on the plunger 78, and seating the valve body 38 onto the seat portion 36A according to an instruction from an in-vehicle controller or the like.

During the extension stroke of the piston rod 6, a displacement of the piston 5 in the cylinder 2 causes the check valve 13 of the piston 5 to be kept closed, and thus the fluid on the cylinder upper chamber 2A side, which corresponds to an upstream chamber, to be pressurized to be then delivered through the passage 22 and the annular passage 21 to be introduced into the passage member 42 of the damping force generation mechanism 26 via the connection port 23 of the separator tube 20, before the disk valve 14 is opened.

At this time, the oil is supplied by an amount corresponding to the displacement of the piston 5 from the reservoir 4 into the cylinder lower chamber 2B by opening the check valve 17 of the base valve 10. When the pressure in the cylinder upper chamber 2A reaches the valve-opening pressure of the disk valve 14 of the piston 5, the disk valve 14 is opened to release the pressure in the cylinder upper chamber 2A to the cylinder lower chamber 2B, which prevents the pressure in the cylinder upper chamber 2A from excessively increasing.

During the compression stroke of the piston rod 6, a displacement of the piston 5 in the cylinder 2 causes the check valve 13 at the piston 5 to be opened and the check valve 17 in the passage 15 of the base valve 10 to be kept closed. Then, before the disk valve 18 is opened, the fluid in the piston lower chamber 2B is introduced into the cylinder upper chamber 2A, and the fluid is transmitted by an amount corresponding to an entry of the piston rod 6 into the cylinder 2 from the cylinder upper chamber 2A, which corresponds to the upstream chamber, into the reservoir 4 by passing through a similar route to the flow during the above-described extension stroke. When the pressure in the cylinder lower chamber 2B reaches the valve-opening pressure of the disk valve 18 of the base valve 10, the disk valve 18 is opened to release the pressure in the cylinder lower chamber 2B into the reservoir 4, which prevents the pressure in the cylinder lower chamber 2B from excessively increasing.

At the damping force generation mechanism 26, the oil conveyed from the passage member 42 is introduced into the reservoir 4, which corresponds to a downstream chamber, by passing through mainly the following three flow passages.

(1) Main Flow Passage

The oil conveyed from the passage member 42 is transmitted through the passages 39A of the main body 39, is delivered into the chamber 25C in the case 25 by opening the disk valve 30 of the main valve 27, and is then introduced into the reservoir 4 by passing through the passage grooves 25B and the opening 24.

(2) Control Flow Passage

The oil conveyed into the passage member 42 is transmitted into the pilot chamber 31 by passing through the insides of the retainer 62 and the spacer 63 provided in the cylindrical portion 41B of the pilot body 41, the cutout 63A of the spacer 63, the passage 52 through the sidewall of the cylindrical portion 41B, and the fixed orifice 32. Further, the oil is delivered from the pilot chamber 31 into the chamber 25C in the case 25 by passing through the passages 53 of the control body 40 and opening the disk valve 33 of the control valve 28, and is then introduced into the reservoir 4 by passing through the passage grooves 25B and the opening 24.

(3) Pilot Flow Passage

The oil conveyed into the passage member 42 is transmitted through the insides of the retainer 62 and the spacer 63, the filter 61, the fixed orifice 35, and the passage 41D provided in the cylindrical portion 41B of the pilot body 41. Further, the oil is delivered into the valve chamber 73 by passing through the passage 68 and the port 36 of the port member 67, and opening the valve body 38 of the pilot valve 29. Then, the oil is forwarded into the chamber 25C in the case 25 by passing through the axial groove 74, the annular recessed portion 69, the radial passage 75, the space 76, and the passage 77, and is then introduced into the reservoir 4 by flowing through the passage grooves 25B and the opening 24.

As a result, the damping force is generated with the aid of the main valve 27, the control valve 28, and the pilot valve 29 of the damping force generation mechanism 26 during both the extension stroke and the compression stroke of the piston rod 6. At this time, the disk valve 30 of the main valve 27 is opened by receiving the pressure on the passage 39A side, while the inner pressure in the pilot chamber 31 provided on the back surface side is applied in the valve-closing direction. In other words, the disk valve 30 is opened based on the differential pressure between the passage 39A side and the pilot chamber 31 side, whereby a reduction in the inner pressure leads to a reduction in the valve-opening pressure, and an increase in the inner pressure leads to an increase in the valve-opening pressure according to the inner pressure in the pilot chamber 31.

Further, the disk valve 33 of the control valve 28 is opened by receiving the pressure on the passage 53 side, while the inner pressure in the pilot chamber 34 formed on the back surface side is applied in the valve-closing direction. In other words, the disk valve 33 is opened based on the differential pressure between the passage 53 side and the pilot chamber 34 side, whereby a reduction in the inner pressure leads to a reduction in the valve-opening pressure, and an increase in the inner pressure leads to an increase in the valve-opening pressure according to the inner pressure in the pilot chamber 34.

When the piston speed falls in a low speed region, the main valve 27 and the control valve 28 are kept closed, and the oil is introduced into the reservoir 4 by passing through mainly the above-described pilot flow passage (3), and the orifice holes 92A and 92B (the orifice 33A) provided at the disk valve 33 of the control valve 28, so that the damping force is generated with the aid of the pilot valve 29 and the orifice 33A. Then, as the pilot speed increases, the pressure on the upstream side of the pilot valve 29 increases. At this time, the inner pressures in the pilot chambers 31 and 34 on the upstream side of the pilot valve 29 are controlled by the pilot valve 29, and reduce when the pilot, valve 29 is opened. As a result, first, the dish valve 33 of the control valve 28 is opened, so that the oil is introduced into the reservoir 4 by passing through the control flow passage (2) in addition to the above-described pilot flow passage (3), which can ease an increase in the damping force according to an increase in the piston speed.

When the disk valve 33 of the control valve 28 is opened, the inner pressure in the pilot chamber 31 reduces. The reduction in the inner pressure in the pilot chamber 31 causes the disk valve 30 of the main valve 27 to be opened, and thus the oil to be introduced into the reservoir 4 by passing through the main flow passage (1) in addition to the above-described pilot flow passage (3) and control flow passage (2), which can suppress or ease the increase in the damping force according to the increase in the piston speed.

In this manner, an appropriate damping force characteristic can be acquired by suppressing or easing the increase in the damping force according to the increase in the piston speed in two steps. Then, the inner pressure in the pilot chamber 34 of the control valve 28, i.e., the valve-opening pressure of the disk valve 33 can be controlled by adjusting the pressure for controlling the pilot valve 29 based on the power supply to the solenoid 37. Further, the inner pressure in the pilot chamber 31 of the main valve 27, i.e., the valve-opening pressure of the disk valve 30 can be controlled based on the valve-opening pressure of the disk valve 33.

Due to this configuration, the disk valve 33 of the control valve 28 in addition to the pilot valve 29 is opened in a region where the main valve 27 is closed, so that a sufficient flow amount of the oil can be acquired, which allows the pilot valve 29 to have a small flow amount (a flow passage area of the port 36), and thus the pilot valve 29 (a solenoid valve) to reduce in size and the solenoid 37 to consume lower power. Further, the damping force can be changed in two steps with the aid of the main valve 27 and the control valve 28, which can enhance the flexibility of adjusting the damping force characteristic to acquire the appropriate damping force characteristic.

At this time, the disk valve 33 of the control valve 28 is provided with the sufficiently small set load (preload) from its deflection so that the valve-opening pressure thereof is set to a low pressure, whereby the valve can be opened in the region where the piston speed is extremely low, and the small damping force can be stably generated when the damping force is rising.

At the disk valve 33 of the control valve 28, the abutment portion of the elastic seal member 58 is in abutment with the bottom portion of the recessed portion of the pilot body. Therefore, the abutment portion of the elastic seal member 58 is urged by the elastic force of the elastic seal member toward the inner and outer seat portion 54 and 55 side. This urging ensures that the disk valve 33 (the seat disk 92) is brought into close contact with the inner and outer seat portions 54 and 55 to acquire the stale damping force characteristic even in the region where the piston speed is extremely low, even though the disk valve 33 is provided with the snail set load or no set load, i.e., the disk valve 33 is not seated on the inner and outer seat portions 54 and 55 with being deflected in advance. Then, the disk valve 33 can be set so as to be opened at a sufficiently low pressure, which allows a further weaker damping force to be set when the damping force characteristic is on the soft side.

Further, the communication groove 107 is formed at the distal portion of the abutment portion 101 of the elastic seal member 58, by which the two chambers 34A and 34B defined and formed in the pilot chamber 34 by the abutment portion 101 are brought into communication with each other via the communication passage 107 when the abutment portion 101 is brought into abutment with the bottom portion 59B of the recessed portion 59 of the pilot body 41. This communication establishment can prevent the differential pressure between the chambers 34A and 34B from affecting the opening/closing operation of the disk valve 33, leading to an unstable damping force.

Especially, in the case where the valve opening of the pilot-type main valve 27 is controlled by the pilot-type control valve 28, like the present embodiment, the valve-opening pressure of the control valve 28 is set to a low pressure, which allows the damping force to smoothly rise in the region where the piston speed is extremely low, and realizes an ideal damping force characteristic for the suspension apparatus of the vehicle.

In the above-described embodiment, the communication passage establishing the communication between the two chambers 34A and 34B defined and formed in the pilot chamber 34 by the abutment portion 101 of the elastic seal member 58 is formed by the communication groove 107 provided at the elastic seal member 58. However, the present invention can be embodied by another configuration. For example, a groove may be formed by performing coining processing on the bottom portion 59B of the pilot body 41, and this groove may be used as the communication passage. Alternatively, the bottom portion which the elastic seal member 58 of the pilot body 41 is in abutment with may be formed by a bottom portion member (not illustrated) such as a washer, which is another member, and the communication passage may be formed on this bottom portion member. At this time, the communication passage can be formed without relying on the groove processing or the like, by using a wavy wave washer.

The present invention can be also applied to a shock absorber including the damping force adjustment mechanism disposed at the piston portion, in addition to the shock absorber including the damping force adjustment mechanism disposed at the side of the cylinder, like the above-described embodiment. Further, the above-described embodiment has been described based on the damping force adjustable shock absorber. However, the present invention is not limited thereto, and can be similarly applied even to a shock absorber that does not adjust the damping force, as long as this shock absorber includes the disk valve using the pilot-type damping valve with the elastic seal member fixedly attached thereto.

The shock absorber according to the above-described embodiment ensures that the disk valve can be closed by the elasticity of the elastic seal member without relying on the set load from the deflection of the disk valve, thereby succeeding in acquiring the stable low damping force.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2014-175674 filed on Aug. 29, 2014.

The entire disclosure of Japanese Patent Application No. 2014-175674 filed on Aug. 29, 2014 including specification, claims, drawings and summary are incorporated herein by reference in its entirety.

What is claimed is:

1. A shock absorber comprising:
a cylinder sealingly containing hydraulic fluid;
a piston slidably disposed in the cylinder;
a piston rod coupled with the piston and extending out of the cylinder;
a disk valve configured to, with respect to a flow of the hydraulic fluid that is caused by a sliding displacement of the piston, generate a damping force by being separated from or seated onto a valve seat to control the flow;
a bottomed cylindrical pilot body opened toward the disk valve; and
an annular elastic seal member fixedly attached to an outer circumferential portion of one end of the disk valve and slidably and liquid-tightly fitted to an inner circumferential portion of the bottomed cylindrical pilot body, the annular elastic seal member forming a pilot chamber configured to apply an inner pressure therein to the disk valve in a valve-closing direction,
wherein the annular elastic seal member is in abutment with a bottom portion of the bottomed cylindrical pilot body, and urges the disk valve toward the valve seat by elasticity of the annular elastic seal member, and
wherein the shock absorber further comprises a communication passage establishing communication between chambers defined in the pilot chamber by the annular elastic seal member in abutment with the bottom portion of the bottomed cylindrical pilot body,
wherein the annular elastic seal member is kept in abutment with the bottom portion of the bottomed cylindrical pilot body when the disk valve is opened, when the disk valve is closed, and while the disk valve is being opened or closed.

2. The shock absorber according to claim 1, wherein the communication passage is provided at the annular elastic seal member.

3. The shock absorber according to claim 1, wherein the communication passage is provided at the bottomed cylindrical pilot body.

4. The shock absorber according to claim 1, wherein the bottomed cylindrical pilot body includes a bottom portion member forming the bottom portion which the annular elastic seal member is in abutment with, and the communication passage is formed at the bottom portion member.

5. The shock absorber according to claim 1, wherein the bottomed cylindrical pilot body includes a recessed portion opened toward the disk valve, and
wherein the annular elastic seal member includes a lip portion in liquid-tight and sliding contact with an inner circumferential surface of the recessed portion, and an abutment portion in abutment with the bottom portion of the recessed portion.

6. The shock absorber according to claim 5, wherein the annular elastic seal member includes a proximal portion fixedly attached to a disk main body of the disk valve, the proximal portion having a small inner diameter and a great thickness in a radial direction.

7. The shock absorber according to claim 6, wherein the annular elastic seal member includes a distal portion extending from the proximal portion, the distal portion having a larger inner diameter than the proximal portion and a thinner thickness in the radial direction than the proximal portion.

8. The shock absorber according to claim 7, wherein an outer circumferential side of the distal portion of the annular elastic seal member forms an outer taper portion having a tapering shape with a dimension thereof reducing toward a tip thereof, and an inner circumferential side of the distal portion forms an inner taper portion having a tapering shape inclined inwardly toward the tip thereof.

9. The shock absorber according to claim 8, wherein an angle defined between a line set by extending a tangential line of the outer taper portion to the disk main body, and the disk main body is smaller than an angle defined between a line set by extending a tangential line of the inner taper portion to the disk main body, and the disk main body.

10. The shock absorber according to claim 9, wherein the distal portion between the outer taper portion and the inner taper portion of the annular elastic seal member is rounded.

11. The shock absorber according to claim 10, wherein a stepped portion extending generally in parallel with an end surface of the disk main body is formed on the inner circumferential side of the distal portion of the annular elastic seal member.

12. The shock absorber according to claim 11, wherein a portion where the inner taper portion and the stepped portion are connected to each other is rounded.

13. The shock absorber according to claim 6, wherein a taper portion having a tapering shape with a diameter thereof increasing toward the distal portion is provided at an inner circumferential portion of the proximal portion of the annular elastic seal member.

* * * * *